US012561164B2

(12) United States Patent
Rehrmann et al.

(10) Patent No.: US 12,561,164 B2
(45) Date of Patent: Feb. 24, 2026

(54) ACCESSING A SHARED DATA SET

(71) Applicant: INTERNATIONAL BUSINESS MACHINES CORPORATION, Armonk, NY (US)

(72) Inventors: Robin Rehrmann, Karlsruhe (DE); Kim Nguyen, Rauenberg (DE); Eric Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 18/446,590

(22) Filed: Aug. 9, 2023

(65) Prior Publication Data

US 2025/0036456 A1 Jan. 30, 2025

(30) Foreign Application Priority Data

Jul. 24, 2023 (GB) ...................................... 2311293

(51) Int. Cl.
G06F 12/00 (2006.01)
G06F 9/46 (2006.01)
G06F 9/48 (2006.01)
(52) U.S. Cl.
CPC .............. G06F 9/485 (2013.01); G06F 9/461 (2013.01); G06F 9/4812 (2013.01)
(58) Field of Classification Search
CPC ........ G06F 9/485; G06F 9/461; G06F 9/4812; G06F 9/528; G06F 2209/523; G06F 9/526; G06F 16/2343; G06F 16/1774
(Continued)

(56) References Cited

U.S. PATENT DOCUMENTS 5,784,613 A 7/1998 Tamirisa
6,029,190 A 2/2000 Oliver
(Continued)

FOREIGN PATENT DOCUMENTS

CN 108933813 B 4/2022
CN 112286697 B 11/2022
GB 2453284 A 4/2009

OTHER PUBLICATIONS

Author Unknown, "pthread_kill(3)—Linux manual page," man7. org [online], [accessed on Jul. 31, 2023], 3 pages, Retrieved from the Internet: <URL: https://man7.org/linux/man-pages/man3/pthread_kill.3.html>.

(Continued)

*Primary Examiner* — Mardochee Chery
(74) *Attorney, Agent, or Firm* — Teddi E. Maranzano

(57) ABSTRACT

A computer implemented method of accessing a shared data set using a shared and an exclusive lock is provided. The method includes: initiating at least one reader thread configured to perform a read operation; recording a reader thread state for the at least one reader thread in a data structure; selectively acquiring the shared lock for the at least one reader thread; implementing processing of the at least one reader thread; selectively interrupting the processing of the at least one reader thread in response to an exclusive lock request; restoring the at least one reader thread state using the reader thread state recorded in the data structure and releasing the shared lock; acquiring an exclusive lock; resuming the processing of the at least one reader thread; reacquiring the shared lock for the at least one reader thread in response to determining a releasing of the exclusive lock.

20 Claims, 9 Drawing Sheets

(58) Field of Classification Search
USPC .......................................................... 718/100
See application file for complete search history.

(56) References Cited

U.S. PATENT DOCUMENTS

| | | | |
|---|---|---|---|
| 6,697,834 B1 | 2/2004 | Dice | |
| 6,745,209 B2 | 6/2004 | Holenstein | |
| 6,934,951 B2 | 8/2005 | Wilkinson, III | |
| 7,380,247 B2 | 5/2008 | Accapadi | |
| 7,698,708 B1 | 4/2010 | Lent | |
| 7,934,062 B2 | 4/2011 | Mckenney | |
| 8,719,828 B2 | 5/2014 | Lewis | |
| 8,973,004 B2 | 3/2015 | Dice | |
| 9,298,707 B1 * | 3/2016 | Zhang | G06F 16/2308 |
| 9,934,077 B2 | 4/2018 | Steinmacher-Burow | |
| 10,728,186 B2 | 7/2020 | Gruschko | |
| 2002/0078119 A1 | 6/2002 | Brenner | |
| 2009/0300017 A1 | 12/2009 | Tokusho | |
| 2010/0333096 A1 | 12/2010 | Dice et al. | |
| 2015/0286586 A1 * | 10/2015 | Yadav | G06F 9/526 |
| | | | 711/152 |
| 2017/0031730 A1 | 2/2017 | Greco | |
| 2017/0091218 A1 | 3/2017 | Zhang | |
| 2017/0220474 A1 * | 8/2017 | Dice | G06F 16/176 |
| 2021/0279225 A1 | 9/2021 | Jeon | |

OTHER PUBLICATIONS

Author Unknown, "setjmp," cppreference [online], [accessed on Jul. 31, 2023], 2 pages, Retrieved from the Internet: <URL: https://en.cppreference.com/w/cpp/utility/program/setjmp>.

Chandhary, et al., "Achieving starvation-freedom in multi-version transactional memory systems," Computing [article], 2022, pp. 2159-2179, DOI: 10.1007/s00607-021-00994-y, Springer Link, Retrieved from the Internet: <URL: https://link.springer.com/article/ 10.1007/s00607-021-00994-y>.

Disclosed Anonoymously, "Method and mechanism of locking biased toward shared read real time response," IP.com, Oct. 14, 2011, 2 pages, IP.com No. IPCOM000211742D, Retrieved from the Internet: <URL: https://priorart.ip.com/IPCOM/000211742>.

Franke, et al., "Fuss, Futexes and Furwocks: Fast Userlevel Locking in Linux," Proceedings of the Ottawa Linux Symposium [article], 2022 [accessed on Jul. 31, 2023], ResearchGate, 20 pages, Retrieved from the Internet: <URL: https://www.researchgate.net/publication/ 240011830_Fuss_Futexes_and_Furwocks_Fast_Userlevel_Locking_ in_Linux>.

Intel®, "Intel® Transactional Synchronization Extension (Intel® TSX) Disable Update for Selected Processors," Intel® [technical paper], Feb. 2022, 9 pages, Rev. 2.1, Document No. 643557.

Kruegel, "CS170: Project 2—User Mode Thread Library (20% of project score)," UC Santa Barbara [project], 2008, [accessed on Jul. 31, 2023], 4 pages, Retrieved from the Internet: <URL: https://sites. cs.ucsb.edu/~chris/teaching/cs170/projects/proj2.html>.

Rehrmann, et al., "Accessing a Shared Data Set," Application and Drawings, Filed on Jul. 24, 2023, 39 Pages, Related GB Patent Application Serial No. 2311293.1.

Wikipedia, "Software transactional memory", Wikipedia, the free encyclopedia, [accessed on Jul. 31, 2023], 6 Pages, Retrieved from the Internet: <URL: https://en.wikipedia.org/wiki/Software_ transactional_memory>.

Brandenburg et al. "Real-Time Resource-Sharing Under Clustered Scheduling: Mutex, Reader-Writer, And K-Exclusion Locks", 2011 Proceedings of the Ninth ACM International Conference on Embedded Software (EMSOFT), Oct. 2011, 10 pages.

International Searching Authority, "Notification of Transmittal of the International Search Report and the Written Opinion of the International Searching Authority, or Declaration," Patent Cooperation Treaty, Nov. 7, 2024, 16 pages, International Application No. PCT/EP2024/069204.

Marshall Dave. Threads: Basic Theory and Libraries, XP055455890, Retrieved from the Internet: URL:https://users.cs.cf.ac.uk/Dave. Marshall/C/node29.html#SECTION00291000000000000000, Jan. 5, 1999, p. 17-20 (22 pages).

Intellectual Property Office, "Patents Act 1977: Search Report under Section 17(5)," Intellectual Property Office, Jan. 31, 2024, 4 pages, GB Application No. 2311293.1.

* cited by examiner

100

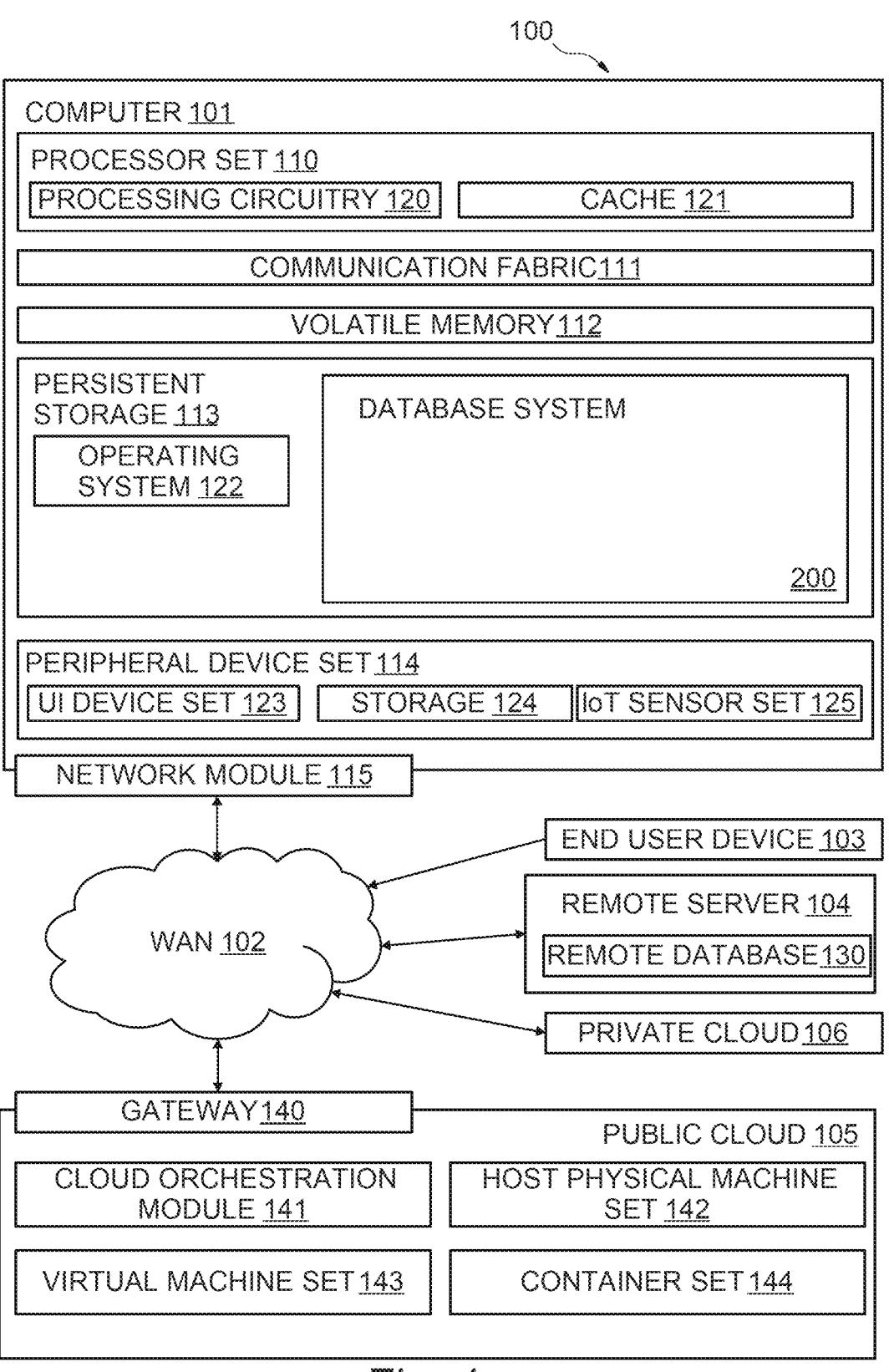

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DATABASE SYSTEM

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Fig. 1

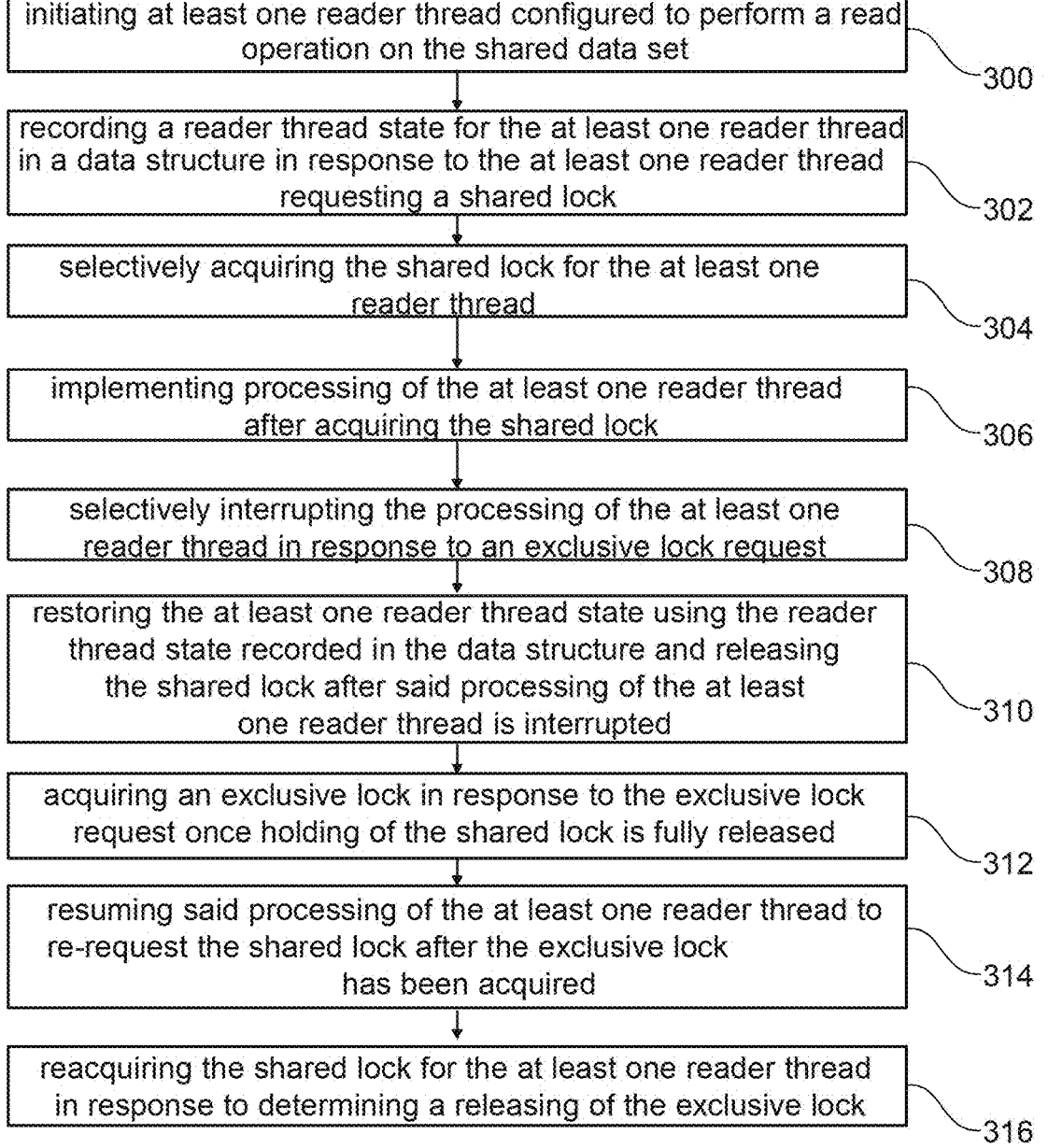

initiating at least one reader thread configured to perform a read operation on the shared data set ⟍300 recording a reader thread state for the at least one reader thread in a data structure in response to the at least one reader thread requesting a shared lock ⟍302 selectively acquiring the shared lock for the at least one reader thread ⟍304 implementing processing of the at least one reader thread after acquiring the shared lock ⟍306 selectively interrupting the processing of the at least one reader thread in response to an exclusive lock request ⟍308 restoring the at least one reader thread state using the reader thread state recorded in the data structure and releasing the shared lock after said processing of the at least one reader thread is interrupted ⟍310 acquiring an exclusive lock in response to the exclusive lock request once holding of the shared lock is fully released ⟍312 resuming said processing of the at least one reader thread to re-request the shared lock after the exclusive lock has been acquired ⟍314 reacquiring the shared lock for the at least one reader thread in response to determining a releasing of the exclusive lock ⟍316

Fig. 3 rollback_selection_to_checkpoint

ACCESSING A SHARED DATA SET

BACKGROUND

The present invention relates to the reading and writing to a shared data set.

When providing read or write access to a shared data set, an exclusive lock may block reader threads.

SUMMARY

In one aspect the invention provides for a computer implemented method of accessing a shared data set using a shared lock and an exclusive lock. The method comprises initiating at least one reader thread configured to perform a read operation on the shared data set. The method further comprises recording a reader thread state for the at least one reader thread in a data structure in response to the at least one reader thread requesting a shared lock. The method further comprises selectively acquiring the shared lock for the at least one reader thread.

The method further comprises implementing processing of the at least one reader thread after acquiring the shared lock. The method further comprises selectively interrupting the processing of the at least one reader thread in response to an exclusive lock request. The method further comprises restoring the at least one reader thread state using the reader thread state recorded in the data structure and releasing the shared lock after the processing of the at least one reader thread is interrupted. The method further comprises acquiring an exclusive lock in response to the exclusive lock request once holding of the shared lock is fully released.

The method further comprises resuming the processing of the at least one reader thread to re-request the shared lock after the exclusive lock has been acquired. The method further comprises reacquiring the shared lock for the at least one reader thread in response to determining a releasing of the exclusive lock.

According to a further aspect of the present invention, the invention provides for a computer program product that comprises a computer-readable storage medium that has computer-readable program code embodied on it. The computer-readable program code is configured to implement a method according to an embodiment.

According to a further aspect, the invention provides for a computer system comprising a processor configured for controlling the computer system. The computer system further comprises a memory storing machine executable instructions. The execution of the instructions causes the processor to initiate at least one reader thread configured to perform a read operation on a shared data set. The execution of the instructions further causes the processor to record a reader thread state for the at least one reader thread in a data structure in response to the at least one reader thread requesting a shared lock. The execution of the instructions further causes the processor to selectively acquire the shared lock for the at least one reader thread.

The execution of the instructions further causes the processor to implement processing of the at least one reader thread after acquiring the shared lock. The execution of the instructions further causes the processor to selectively interrupt the processing of the at least one reader thread in response to an exclusive lock request. The execution of the instructions further causes the processor to restore the at least one reader thread state using the reader thread state recorded in the data structure and releasing the shared lock after the processing of the at least one reader thread is interrupted. The execution of the instructions further causes the processor to acquire an exclusive lock in response to the exclusive lock request once holding of the shared lock is fully released.

The execution of the instructions further causes the processor to resume the processing of the at least one reader thread to re-request the shared lock after the exclusive lock has been acquired. The execution of the instructions further causes the processor to reacquire the shared lock for the at least one reader thread in response to determining a releasing of the exclusive lock.

BRIEF DESCRIPTION OF THE DRAWINGS

In the following embodiments of the invention are explained in greater detail, by way of example only, making reference to the drawings in which:

FIG. 1 illustrates an example of a computing environment.

FIG. 3 shows a flow chart which illustrates a method of operating the computing environment of FIG. 1 or 2.

DETAILED DESCRIPTION

Figure 2:
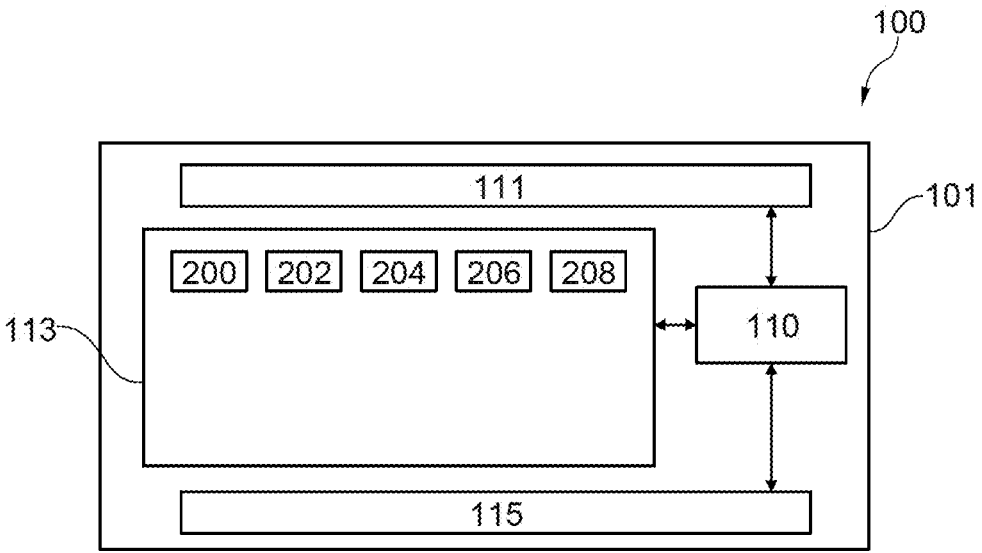
FIG. 2 shows a further view of the computing environment of FIG. 1.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Database systems may be configured such that at least one reader thread can access a shared data set. If a writer thread is used to write to or alter the shared data set, the write thread may block the at least one reader thread. A current way of handling multiple parallel threads is to use a transactional memory implementation such as hardware transactional memory or software transactional memory. This may be used to provide a shared-memory abstraction that may be used to manage the multiple threads. Transactional memory implementations may have several disadvantages. Hardware transactional memory may for example be expensive to implement and software transactional memory may for example have a large overhead caused by maintaining a log and committing transactions.

Examples may be beneficial because they may provide a means of restoring reader threads after they have been interrupted using a minimum of machine resources by possibly eliminating the need for a transactional memory implementation. As described below, recording the reader thread state in a data structure enables the processing of the at least one reader thread to be stored with a minimum of resources. Selectively acquiring the shared lock for the at least one reader thread may include using different criteria to decide if a reader thread is added to the shared lock or not. For example, reader threads may be added to a shared lock if there are no exclusive lock requests pending.

The method further comprises implementing processing of the at least one reader thread. The method further comprises selectively interrupting the processing of the at least one reader thread in response to an exclusive lock request. The exclusive lock request could for example be an exclusive lock request for a writer thread to write the shared data set. Selectively interrupting the processing of the at least one reader thread in response to the exclusive lock request may comprise identifying reader threads of the at least one reader thread having acquired a shared lock, and then selecting a subset of the identified reader threads using at least one interruption criterion.

The method further comprises restoring the at least one reader thread state using the reader thread state recorded in the data structure and releasing the shared lock after the processing of the at least one reader thread is interrupted. The at least one reader thread has been restored to the state it had when the reader thread state was recorded into the data structure.

The method further comprises acquiring an exclusive lock in response to the exclusive lock request once holding of the shared lock is fully released. Fully releasing the shared lock means that there are no other holders of this lock. The method further comprises resuming the processing of the at least one reader thread to re-request the shared lock after the exclusive lock has been acquired. The method further comprises reacquiring the shared lock for the at least one reader thread in response to determining a releasing of the exclusive lock. Determining the release of the exclusive lock means that it is determined that there are no longer any threads which hold the exclusive lock. The reader thread state of the at least one reader thread has been restored by retrieving the reader thread state from the data structure and, for example, loading it into a CPU. The method may be advantageous because the restoration of the reader threads is accomplished using the reader thread states recorded in the data structure instead of using expensive transactional memory and without the overhead of a software transactional memory.

Access to the shared data set may be provided in different ways, in different examples. In one example the shared data set is a shared data set available via a database management system, the shared data set could for example be a structured file, a database, a memory buffer, a shared data structure (such as a list), or a database view.

In some examples, if multiple reader threads are initiated, they may be initiated at the same time or they may be added at different times. For example, the different reader threads may be initiated at different times in which case as a reader thread is initiated it may be added to an existing shared lock.

In a further example, the reader thread state for the at least one reader thread state comprises at least one CPU state of the at least one reader thread. This may enable the restoration of a thread to its state when it was stored in the data structure.

In another example, the at least one CPU state comprises register contents and thread stack contents of at least one CPU. This may be beneficial because this data may be useful in restoring the at least one reader thread to its prior state.

In another example, the method further comprises at least partially constructing the reader thread state using a sigsetjmp function. This example may be beneficial because it may provide a means of efficiently implementing the system.

In another example, restoring that at least one reader thread is at least partially performing using a siglongjmp function. This example may be beneficial because it may also provide a means of efficiently implementing the system.

In another example, the interruption of the at least one reader thread is at least partially performed by sending a signal to the at least one reader thread.

In another example, sending the signal to the at least one reader thread is implemented using a pthread_kill function.

In another example, selectively interrupting the processing of the at least one reader thread in response to an exclusive lock request comprises: identifying reader threads of the at least one reader thread having acquired a shared lock and selecting a subset of the identified reader threads using at least one interruption criterion. This may enable a means of selecting reader threads that all satisfy the at least one interruption criterion to be interrupted. Threads which do not satisfy the at least one interruption criterion would not be interrupted and would effectively block the exclusive lock request.

In another example, the at least one interruption criterion comprises an identification of one of the at least one reader thread as being non-interruptible. The method further comprises delaying acquiring the exclusive lock until completion of the one of the at least one reader thread identified as being non-interruptible. This may be beneficial because it may provide a means of preventing the exclusive lock from being implemented and stopping designated reader threads.

In another example, the at least one interruption criterion comprises an estimate of thread completion above a predetermined completion threshold. This may mean there may be a model or measure of how close a thread is to being completed. The method further comprises delaying acquiring the exclusive lock until completion of the one of the at least one reader thread identified as fulfilling the estimate of thread completion above the predetermined completion threshold is finished. In this example if a reader thread has completed more than the predetermined completion threshold then it is not interrupted by the exclusive lock. The exclusive lock waits until those threads are finished before being implemented.

In another example, the data structure stores an acquired lock time for the at least one reader thread. The at least one interruption criterion comprises a predetermined process age. The method further comprises delaying acquiring the exclusive lock if the acquired lock time is older than the predetermined process age. This may be beneficial because it may provide a means of enabling an older read thread to finish before granting the exclusive lock.

In another example, the data structure stores an actor priority for the at least one reader thread. The predetermined criterion comprises a predetermined priority. The method further comprises delaying the exclusive lock if the actor priority is above the predetermined priority. This embodiment may be beneficial because it may provide a means of preventing important threads from being interrupted by the write lock.

In another example, the at least one interruption criterion comprises an age of one or more of the at least one reader thread. A reader thread selected from the at least one reader thread with an age greater than a predetermined thread age is permitted a predetermined completion time before the exclusive lock is implemented. This may be beneficial because it may enable reader threads which have been running for a long time to continue before they are interrupted.

In another example, the method further comprises delaying acquisition of the exclusive lock until all locks of the shared data set have been released. This may be beneficial because the exclusive lock is not granted if another process has access to the shared data set.

In another example, selectively acquiring the shared lock for the at least one reader thread comprises acquiring the shared lock if no exclusive lock requests are outstanding.

In another example, selectively acquiring the shared lock for the at least one reader thread comprises acquiring the shared lock if an exclusive lock request is outstanding and other shared reader threads are accessing the shared data set.

In another example, selectively acquiring the shared lock for the at least one reader thread comprises delaying acquiring the shared lock when an exclusive lock has been acquired by a writer thread for performing a write operation on the shared data set.

In another example, selectively acquiring the shared lock for the at least one reader thread comprises acquiring the shared lock if one or more locking criterion is satisfied.

In another example, the one or more locking criterion comprises the at least one reader thread being a interruptible reader thread.

In another example, other reader threads requesting the shared lock after reception of the exclusive lock requests are permitted to selectively acquire the shared lock during the predetermined completion time. This embodiment may be beneficial because instead of simply waiting until the exclusive lock is acquired and then released the system is able to accept additional reader threads and allow them to operate in what would otherwise been wasted time.

In another example, the data structure is stored in a process memory.

In another example the data structure is stored in a thread local storage.

In another example, the data structure is stored in a persistent storage.

In another example, the data structure is stored in a disc memory.

In another example, the data structure is stored in a tape memory.

In another example, the exclusive lock is an exclusive write lock for a writer thread configured for writing to the shared data set.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a database system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates a further example of the computing environment 100. Not all features present in the illustration in FIG. 1 are shown in FIG. 2.

The persistent storage 113 is shown as containing the implementation of a database system 200. The database system 200 may be used to provide access to a shared dataset 202. The memory 113 is further shown as containing a shared lock request 204 that was received from at least one reader thread. The memory 113 is further shown as containing a data structure 206 that is used to record the reader thread state for at least one reader thread. The memory 113 is further shown as containing an exclusive lock request 208 that was received from a writer thread configured to perform a write operation on the shared dataset 202.

FIG. 3 is a flowchart which illustrates a method of operating the computer system 100 in FIGS. 1 and 2. In step 300 at least one reader thread is initiated and is configured to perform a read operation on the shared dataset 202. In step 302 a reader thread state is recorded for the at least one reader thread in a data structure 206 in response to receiving of the shared lock request 204 from the at least one reader thread. In step 304 the shared lock is selectively acquired for the at least one reader thread. In step 306 processing of the at least one reader thread is implemented after they acquire the shard lock. In step 308 the processing of the at least one reader thread is selectively interrupted by the exclusive lock. Certain read threads may have properties which exclude them from being interrupted. For example, non-interruptible threads or threads which have an age over a predetermined threshold may be not be interrupted.

In step 310 the at least one reader thread state is restored using the reader thread state recorded in the data structure after the processing of the at least one reader thread is interrupted. In step 312 the exclusive lock is acquired in response to the exclusive lock request once the holding of the shared lock is fully released. The shared lock is fully released when there are no longer any threads which are holders of the shared lock.

In step 314 processing of the at least one reader thread is resumed to re-request the shared lock. In step 316, the shared lock for the at least one reader thread is reacquired in response to the release of the exclusive lock. Once the shared lock is received, the at least one reader thread can resume their read operations on the shared data set 202.

Figure 4:
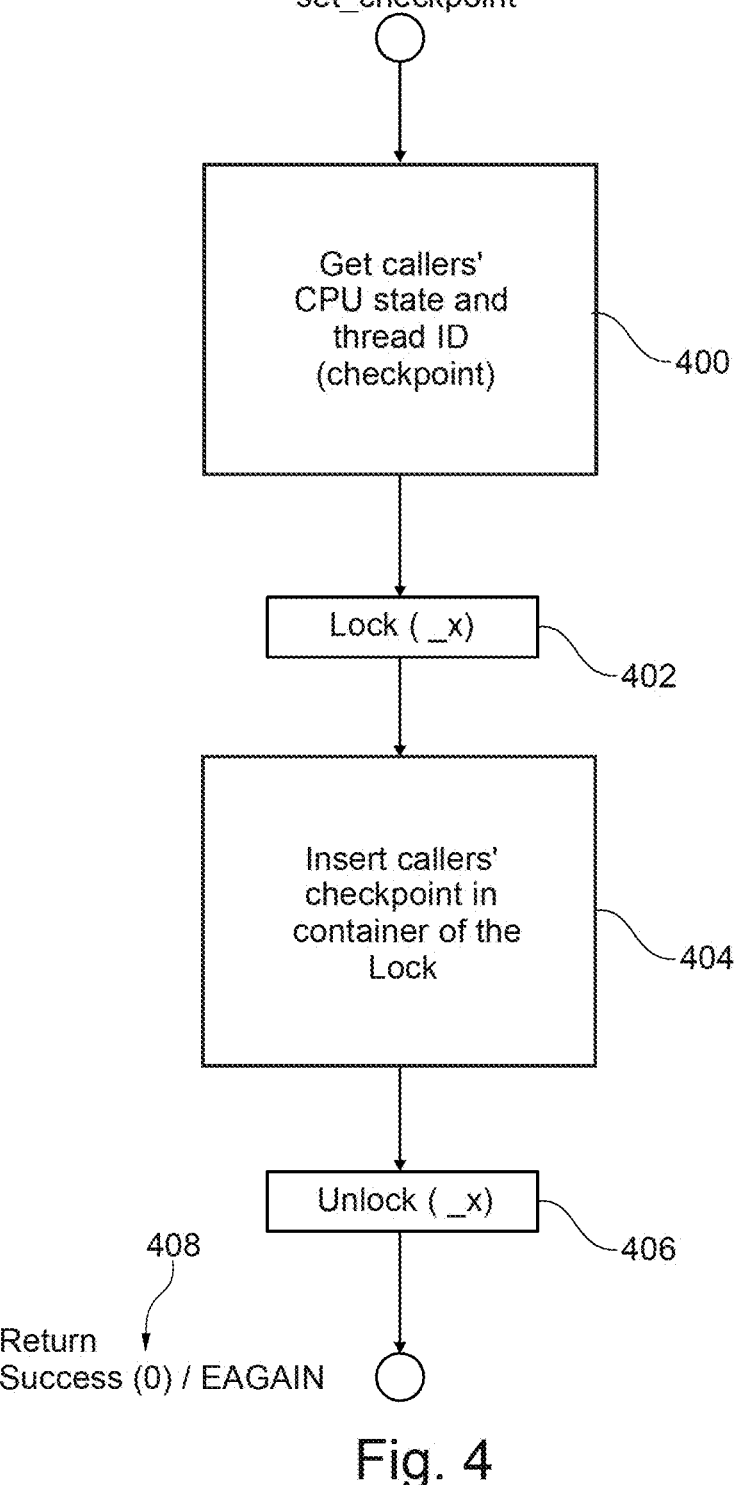
FIG. 4 illustrates a function for setting a checkpoint in the data structure for a reader thread requesting the shared lock.

FIG. 4 illustrates a function for setting a checkpoint in the data structure 206 for a reader thread requesting the shared lock. This is equivalent to recording the reader thread state for the at least one reader thread in the data structure 206. In step 400 the CPU state of the reader thread requesting the shared lock is obtained. Locking the recording of the reader thread state in data structure 206 prevents modification of the data structure by another process during writing of the reader thread state to the data structure 206. The locking of the data structure 206 is different from the shared lock and the exclusive lock. The data structure 206 is used to store the reader thread states for the at least one reader thread. The locking of the data structure 206 is used to protect the integrity data structure 206 when it is being accessed.

In step 402 a lock protecting the data structure 206 is called. In step 404 the reader thread which requested a lock has its CPU state recorded in the data structure 206. In step 406 the lock to the data structure 206 is released. 408 represents the return of the function in block 406 which is provided to the signal handler. The value 0 is the call to the function was successful. "EAGAIN" is returned if the thread was reset to its checkpoint. The error code EAGAIN is a predefined Posix error-code that means that the reader thread was interrupted.

Figure 5:
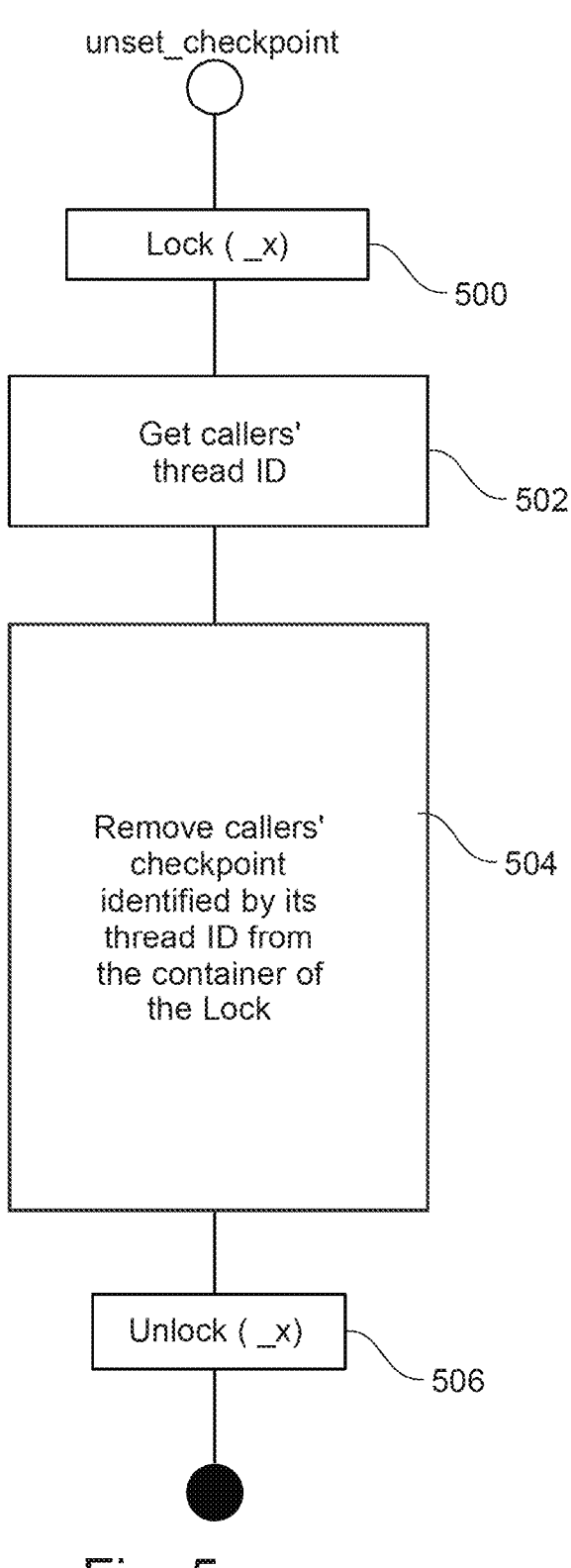
FIG. 5 illustrates how to remove a record of a reader from the data structure.

FIG. 5 illustrates how to remove a record of a reader thread (removal of a reader thread state) from the data structure 206. First, 500, the data structure 206 is locked, see process in FIG. 4. Locking the data structure prevents modification of the data structure by another process during removal of the reader thread state. In step 502 the reader thread's caller ID is obtained. The reader thread's caller ID is the thread-ID or process-ID of the reader thread which is having its reader thread state removed from the data structure 206. In block 504 the data structure 206 is modified such that the reader thread state is removed. The reader thread's caller ID is used to identify the record of the reader thread in the data structure 206. In step 506 the data structure 206 is unlocked.

Figure 6:
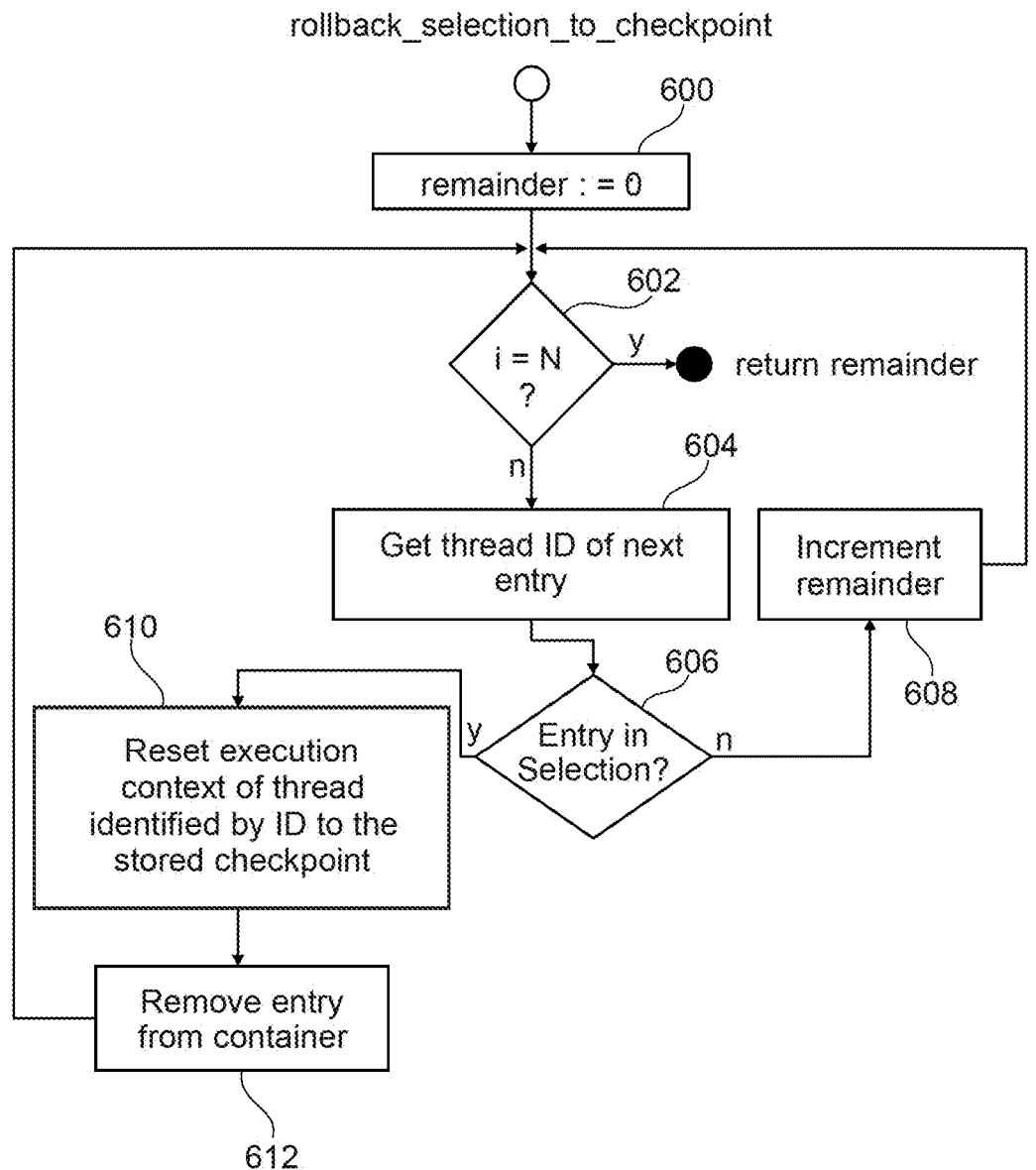
FIG. 6 illustrates how to roll back a reader thread to a checkpoint stored in the data structure.
Figure 7:
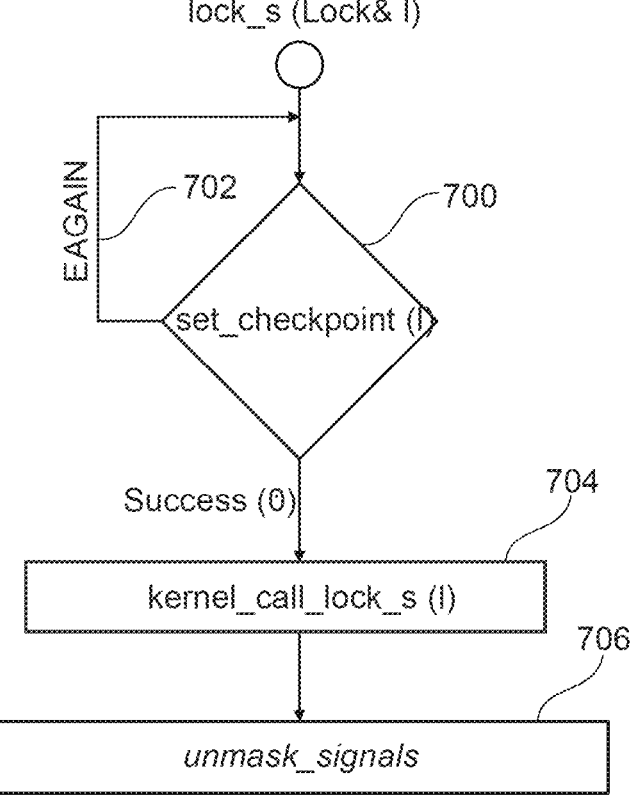
FIG. 7 illustrates a process of locking reader threads in kernel space during the addition of the threads to the data structure.
Figure 8:
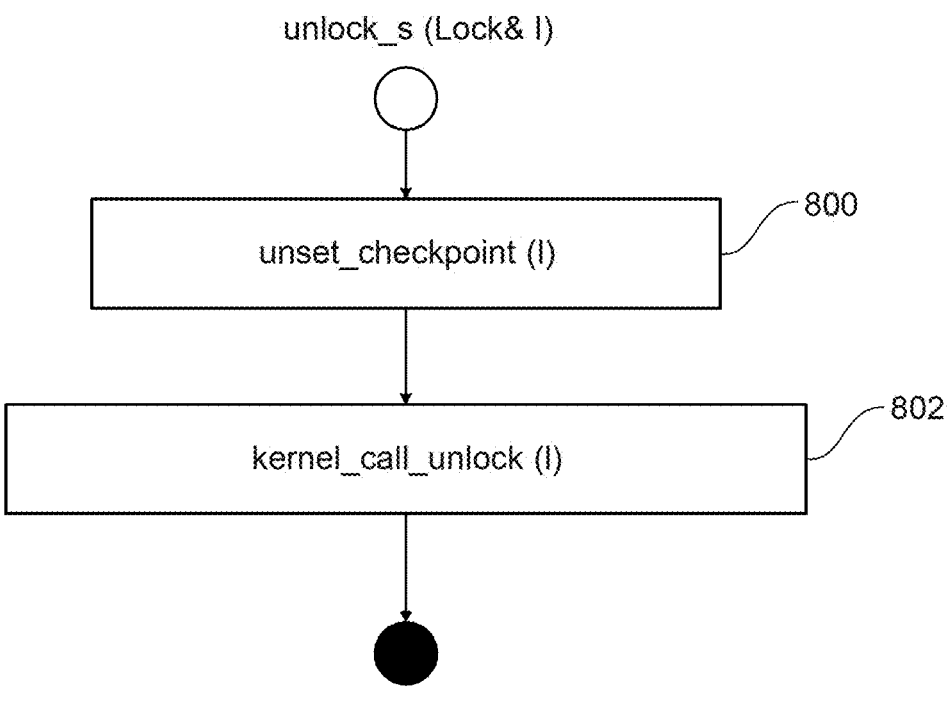
FIG. 8 shows illustrates a process of unlocking the reader thread in kernel space.
Figure 9:
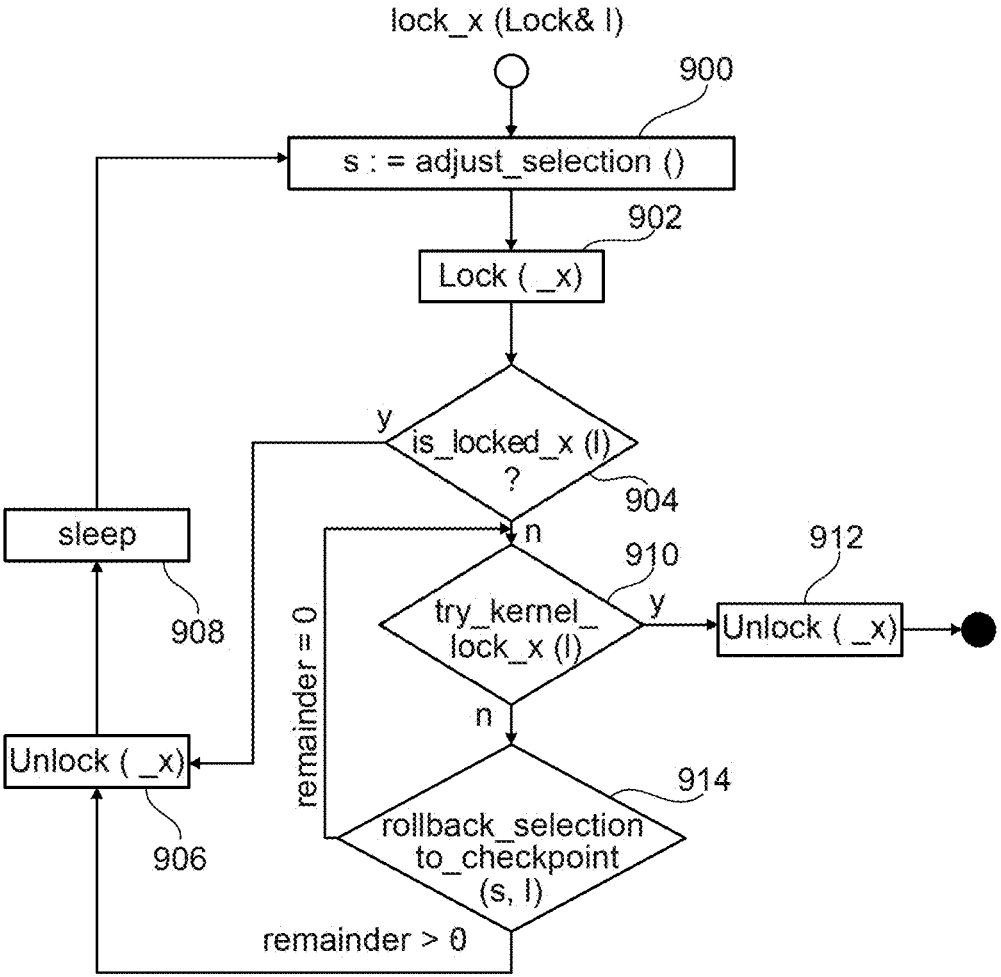
FIG. 9 illustrates exclusive locking in kernel space.

FIG. 6 illustrates how to roll back a reader thread to its checkpoint which is stored in the data structure 206. This is a restoration of the at least one reader thread state using the reader thread state recorded in the data structure 206. A roll back is a restoration of the thread to a prior or earlier state. In block 600 an iterator variable "remainder" is set to zero. An iterator variable is a variable that is used to keep track of the progress of a loop in a program or function. The variable "remainder" represents how many reader thread states are left in the data structure after executing the function pictured in FIG. 6. The number of active reader threads is the variable "N." Next, in step 602, iteration is made over all entries in the data structure. If the iterator is equal to N or the number of entries in the data structure 206 then the function proceeds to yes and the remainder is returned. If the answer is "no" the block proceeds to step 604. In block 604 the thread ID of the next reader thread is obtained. Next, in block 606 it is determined "if the entry is in the selection." In step 606 it is checked if a particular reader thread state is the reader thread state has been selected to be rolled back. If the answer is "no" the method returns to block 608 and the iterator "I" and the variable "remainder" are incremented. The value of "remainder" is incremented because the reader thread state was not selected to be used for a rollback. If the answer is "yes," in block 610 execution of the reader thread is reset to the stored checkpoint in the data structure 206 (Rest execution context of thread identified by ID to the stored checkpoint). Then in block 612 the thread is removed from the container (the data structure 206). The method then proceeds back to block 602. The method ends when all of the reader thread states in the data structure 206 have been iterated through and kept for later roll-back or removed after a rollback FIGS. 7, 8, and 9 show flowcharts for several methods of using an API in kernel space locking. Kernel space locking is a locking operation performed in the CPU execution space of the kernel (of the operating system). The locking process in FIGS. 7, 8, and 9 describes locking of the data structure 206, which stores the reader thread states for the at least one reader thread.

FIG. 7 illustrates a process of shared locking in kernel space during the addition of the at least one reader thread to the data structure 206 using the set_checkpoint function of FIG. 4. The locking in kernel space is used to prevent the data structure 206 from being edited by two sources at the same time. Block 700 represents a call to set_checkpoint as illustrated in FIG. 4 to add a reader thread to the data structure 206 and install a signal handler for the thread. An exemplary signal handler implementation calls std:: longjmp, to set the return-value of set_checkpoint to EAGAIN. If the function 700 returns the error code EAGAIN (indicating that the call to set_checkpoint was interrupted), then arrow 702 is followed and this is repeated until the thread is not interrupted. Upon success of the step 700 the reader thread state was successfully recorded in the data structure 206 and then in block 704 the kernel space locking is performed. Next, in step 706, the signal handler is configured. Signals are unmasked and the kernel space jump back is called. A kernel space jump back returns the current process from operating in the kernel space, for example return to user space.

FIG. 8 illustrates a call to the unset_checkpoint function of FIG. 5 in and unlocking the reader thread in kernel space. Step 800 the function unset_checkpoint removes the calling thread from the data structure 206 and removes the signal handler. In step 802 the lock on the reader thread in the data structure 206 is released.

FIG. 9 illustrates an exclusive locking in kernel space. This function is used to provide the exclusive lock in step 308 of FIG. 3 in kernel space. The first function 900 adjust_selection defines what kind of reader threads are to be removed if a lock is not wanted. The adjust_selection function can be used to decide which types of reader threads or under what conditions a reader thread is or is not suspended. For example, this function call may be used so that the processing of the acquired shared lock of the at least one reader thread is selectively interrupted using at least one predetermined criterion. As an example, reader threads which have been running for a long time could be spared from being interrupted.

Block 902 is used to avoid loops by blocking the function set_checkpoint as illustrated in FIG. 4. When a reader is reset to its checkpoint, it may try to reset its checkpoint immediately. Without a lock, the algorithm could remove a thread from the beginning of the data structure 206 and then the reader thread would insert itself at the end of the data structure 206. This could cause an infinite loop, where the writer thread removes readers threads from the beginning, and they subsequently insert the reader threads at the end.

In step 904 it is checked if the shared dataset 202 is already locked by another thread with an exclusive lock. If the answer is "yes" the block proceeds to step 906 where the lock for the data structure 206 that was set in step 902 is released. The block proceeds to block 908 where the process waits in a sleep (for example waits for a predetermined delay) and then returns to block 900. Turning back to block 904 if there is no existing exclusive lock for the shared dataset 202 yet the method proceeds to block 910. In block 910 it is tried to get an exclusive lock (using the function try_kernel_lock_x) for the shared dataset 202. If this is successful it proceeds to block 912 where lock to the data structure 206 is released. If it is not successful it proceeds to block 914 and the various threads are rolled back to the checkpoints stored in the data structure 206. In this function the value remainder is used to identify the number of reader threads left. If more than zero threads reside in the shared data set 202 (remainder >0), the data structure 206 is unlocked in block 906 so that other threads (even those, recently removed) can set their checkpoint (again) and enter the shared data set 202. The selection criteria may then be readjusted in block 900 and retried. For example, the at least one predetermined criterion may be changed so that it is possible to remove more reader threads than before so that there is a successful exclusive lock for the writer thread to write to the shared data set 202. If the remainder is equal to zero, this means there are no reader threads left that are trying to access data in the shared data set 202 and another attempt can be made for a kernel lock by returning to step 910.

Various examples may possibly be described by one or more of the following features in the following numbered clauses:

Clause 1. A computer implemented method of accessing a shared data set using a shared lock and an exclusive lock, the method comprising:

initiating at least one reader thread configured to perform a read operation on the shared data set;

recording a reader thread state for the at least one reader thread in a data structure in response to the at least one reader thread requesting a shared lock;

selectively acquiring the shared lock for the at least one reader thread;

implementing processing of the at least one reader thread after acquiring the shared lock;

selectively interrupting the processing of the at least one reader thread in response to an exclusive lock request;

restoring the at least one reader thread state using the reader thread state recorded in the data structure and releasing the shared lock after the processing of the at least one reader thread is interrupted;

acquiring an exclusive lock in response to the exclusive lock request once holding of the shared lock is fully released;

resuming the processing of the at least one reader thread to re-request the shared lock after the exclusive lock has been acquired;

reacquiring the shared lock for the at least one reader thread in response to determining a releasing of the exclusive lock.

Clause 2. The computer implemented method of clause 1, wherein the reader thread state for the at least one reader thread comprises at least one CPU state of the at least one reader thread.

Clause 3. The computer implemented method of clause 2, wherein the at least one CPU state comprises register contents and thread stack contents of at least one CPU.

Clause 4. The computer implemented method of clause 1, 2, or 3, wherein the method further comprises at least partially constructing the reader thread state using a sigsetjmp function.

Clause 5. The computer implemented method of any one of clauses 1 through 4, wherein restoring the at least one reader thread is at least partially performed using siglongjmp function.

Clause 6. The computer implemented method of any one of clauses 1 through 5, wherein the interruption of the at least one reader thread is at least partially performed by sending a signal to the at least one reader thread.

Clause 7. The computer implemented method of clause 6, wherein sending the signal to the at least one reader thread is implemented using a pthread_kill function.

Clause 8. The computer implemented method of any one of clauses 1 through 7, wherein selectively interrupting the processing of the at least one reader thread in response to an exclusive lock request comprises:

identifying reader threads of the at least one reader thread having acquired a shared lock; and selecting a subset of the identified reader threads using at least one interruption criterion.

Clause 9. The computer implemented method of clause 8, wherein the at least one interruption criterion comprises an identification of one of the at least one reader thread as being non-interruptible, wherein the method further comprises delaying acquiring the exclusive lock until completion of the one of the at least one reader thread identified as being non-interruptible.

Clause 10. The computer implemented method of clause 8 or 9, wherein the at least one interruption criterion comprises an estimate of thread completion above a predetermined completion threshold, wherein the method further comprises delaying acquiring the exclusive lock until completion of the one of the at least one reader thread identified as fulfilling the estimate of thread completion above the predetermined completion threshold is finished.

Clause 11. The computer implemented method of clause 8, 9, or 10, wherein the data structure stores an acquired lock time for the at least one reader thread, wherein the at least one interruption criterion comprises a predetermined process age, wherein the method further comprises delaying acquiring the exclusive lock if the acquired lock time is older than the predetermined process age.

Clause 12. The computer implemented method of any one of clauses 8 through 11, wherein the data structure stores an actor priority for the at least one reader thread, wherein the at least one interruption criterion comprises a predetermined priority, wherein the method further comprises delaying acquisition of the exclusive lock if the actor priority is above the predetermined priority.

Clause 13. The computer implemented method of any one of clauses 8 through 12, wherein the at least one interruption criterion comprises an age of one or more of the at least one reader thread, wherein a reader thread selected from the at least one reader thread with an age greater than a predetermined thread age is permitted a predetermined completion time before the reader thread is selected to be interrupted.

Clause 14. The computer implemented method of any one of clauses 1 through 13, wherein the method further comprises delaying acquisition of the exclusive lock until all locks of the shared data set have been released.

Clause 15. The computer implemented method of any one of clauses 1 through 14, wherein selectively acquiring the shared lock for the at least one reader thread comprises any one of the following:

acquiring the shared lock if no exclusive lock requests are outstanding;

acquiring the shared lock if an exclusive lock request is outstanding and other shared reader threads are accessing the shared data set;

acquiring the shared lock if one or more locking criterion is satisfied;

delay acquiring the shared lock when an exclusive lock has been acquired by a writer thread for performing a write operation on the shared data set; and combinations thereof.

Clause 16. The computer implemented method of clause 15, whereby the one or more locking criterion comprises the at least one reader thread being a interruptible reader thread.

Clause 17. The computer implemented method of clause 15 or 16, wherein other reader threads requesting the shared lock after the exclusive lock request are permitted to selectively acquire the shared lock during a predetermined completion time.

Clause 18. The computer implemented method of any one of clauses 1 through 17, wherein the data structure is stored in any one of the following: a process memory, in thread local storage, a persistent storage, a disc memory, and a tape memory.

Clause 19. A computer program product comprising a computer-readable storage medium having computer-readable program code embodied therewith, the computer-readable program code configured to implement the method of any one of clauses 1 through 18.

Clause 20. A computer system comprising:

a processor configured for controlling the computer system; and a memory storing machine executable instructions, execution of the instructions causes the processor to:

initiate at least one reader thread configured to perform a read operation on a shared data set;

record a reader thread state for the at least one reader thread in a data structure in response to the at least one reader thread requesting a shared lock;

selectively acquire the shared lock for the at least one reader thread;

implement processing of the at least one reader thread after acquiring the shared lock;

selectively interrupt the processing of the at least one reader thread in response to an exclusive lock request;

restore the at least one reader thread state using the reader thread state recorded in the data structure and releasing the shared lock after the processing of the at least one reader thread is interrupted;

acquire an exclusive lock in response to the exclusive lock request once holding of the shared lock is fully released;

resume the processing of the at least one reader thread to re-request the shared lock after the exclusive lock has been acquired; and reacquiring the shared lock for the at least one reader thread in response to determining a releasing of the exclusive lock.

What is claimed is:

1. A computer implemented method of accessing a shared data set using a shared and an exclusive lock, the method comprising:

initiating at least one reader thread configured to perform a read operation on the shared data set;

recording a reader thread state for the at least one reader thread in a data structure in response to the at least one reader thread requesting a shared lock;

selectively acquiring the shared lock for the at least one reader thread;

implementing processing of the at least one reader thread after acquiring the shared lock;

selectively interrupting the processing of the at least one reader thread in response to an exclusive lock request;

restoring the at least one reader thread state using the reader thread state recorded in the data structure and releasing the shared lock after the processing of the at least one reader thread is interrupted;

acquiring an exclusive lock in response to the exclusive lock request once holding of the shared lock is fully released;

resuming the processing of the at least one reader thread to re-request the shared lock after the exclusive lock has been acquired; and reacquiring the shared lock for the at least one reader thread in response to determining a releasing of the exclusive lock.

2. The computer implemented method of claim 1, wherein the reader thread state for the at least one reader thread comprises at least one CPU state of the at least one reader thread.

3. The computer implemented method of claim 2, wherein the at least one CPU state comprises register contents and thread stack contents of at least one CPU.

4. The computer implemented method of claim 1, wherein the method further comprises at least partially constructing the reader thread state using a sigsetjmp function.

5. The computer implemented method of claim 1, wherein restoring the at least one reader thread is at least partially performed using siglongjmp function.

6. The computer implemented method of claim 1, wherein the interruption of the at least one reader thread is at least partially performed by sending a signal to the at least one reader thread.

7. The computer implemented method of claim 6, wherein sending the signal to the at least one reader thread is implemented using a pthread_kill function.

8. The computer implemented method of claim 1, wherein selectively interrupting the processing of the at least one reader thread in response to an exclusive lock request comprises:

identifying reader threads of the at least one reader thread having acquired a shared lock; and selecting a subset of the identified reader threads using at least one interruption criterion.

9. The computer implemented method of claim 8, wherein the at least one interruption criterion comprises an identification of one of the at least one reader thread as being non-interruptible, wherein the method further comprises delaying acquiring the exclusive lock until completion of the one of the at least one reader thread identified as being non-interruptible.

10. The computer implemented method of claim 8, wherein the at least one interruption criterion comprises an estimate of thread completion above a predetermined completion threshold, wherein the method further comprises delaying acquiring the exclusive lock until completion of the one of the at least one reader thread identified as fulfilling the estimate of thread completion above the predetermined completion threshold is finished.

11. The computer implemented method of claim 8, wherein the data structure stores an acquired lock time for the at least one reader thread, wherein the at least one interruption criterion comprises a predetermined process age, wherein the method further comprises delaying acquiring the exclusive lock if the acquired lock time is older than the predetermined process age.

12. The computer implemented method of claim 8, wherein the data structure stores an actor priority for the at least one reader thread, wherein the at least one interruption criterion comprises a predetermined priority, wherein the method further comprises delaying acquisition of the exclusive lock if the actor priority is above the predetermined priority.

13. The computer implemented method of claim 8, wherein the at least one interruption criterion comprises an age of one or more of the at least one reader thread, wherein a reader thread selected from the at least one reader thread with an age greater than a predetermined thread age is permitted a predetermined completion time before the reader thread is selected to be interrupted.

14. The computer implemented method of claim 1, wherein the method further comprises delaying acquisition of the exclusive lock until all locks of the shared data set have been released.

15. The computer implemented method of claim 1, wherein selectively acquiring the shared lock for the at least one reader thread comprises any one of the following:

acquiring the shared lock if no exclusive lock requests are outstanding;

acquiring the shared lock if an exclusive lock request is outstanding and other shared reader threads are accessing the shared data set;

acquiring the shared lock if one or more locking criterion is satisfied;

delay acquiring the shared lock when an exclusive lock has been acquired by a writer thread for performing a write operation on the shared data set; and combinations thereof.

16. The computer implemented method of claim 15, whereby the one or more locking criterion comprises the at least one reader thread being a interruptible reader thread.

17. The computer implemented method of claim 15, wherein other reader threads requesting the shared lock after the exclusive lock request are permitted to selectively acquire the shared lock during a predetermined completion time.

18. The computer implemented method of claim 1, wherein the data structure is stored in any one of the following: a process memory, in thread local storage, a persistent storage, a disc memory, and a tape memory.

19. A computer program product comprising a non-transitory tangible storage device having program code embodied therewith, the program code executable by a processor of a computer to perform a method, the method comprising:

initiating at least one reader thread configured to perform a read operation on the shared data set;

recording a reader thread state for the at least one reader thread in a data structure in response to the at least one reader thread requesting a shared lock;

selectively acquiring the shared lock for the at least one reader thread;

implementing processing of the at least one reader thread after acquiring the shared lock;

selectively interrupting the processing of the at least one reader thread in response to an exclusive lock request;

restoring the at least one reader thread state using the reader thread state recorded in the data structure and releasing the shared lock after the processing of the at least one reader thread is interrupted;

acquiring an exclusive lock in response to the exclusive lock request once holding of the shared lock is fully released;

resuming the processing of the at least one reader thread to re-request the shared lock after the exclusive lock has been acquired;

reacquiring the shared lock for the at least one reader thread in response to determining a releasing of the exclusive lock.

20. A computer system comprising:

a processor configured for controlling the computer system; and a memory storing machine executable instructions, execution of the instructions causes the processor to:

initiate at least one reader thread configured to perform a read operation on a shared data set;

record a reader thread state for the at least one reader thread in a data structure in response to the at least one reader thread requesting a shared lock;

selectively acquire the shared lock for the at least one reader thread;

implement processing of the at least one reader thread after acquiring the shared lock;

selectively interrupt the processing of the at least one reader thread in response to an exclusive lock request;

restore the at least one reader thread state using the reader thread state recorded in the data structure and releasing the shared lock after the processing of the at least one reader thread is interrupted;

acquire an exclusive lock in response to the exclusive lock request once holding of the shared lock is fully released;

resume the processing of the at least one reader thread to re-request the shared lock after the exclusive lock has been acquired; and reacquire the shared lock for the at least one reader thread in response to determining a releasing of the exclusive lock.

* * * * *